No. 779,703.

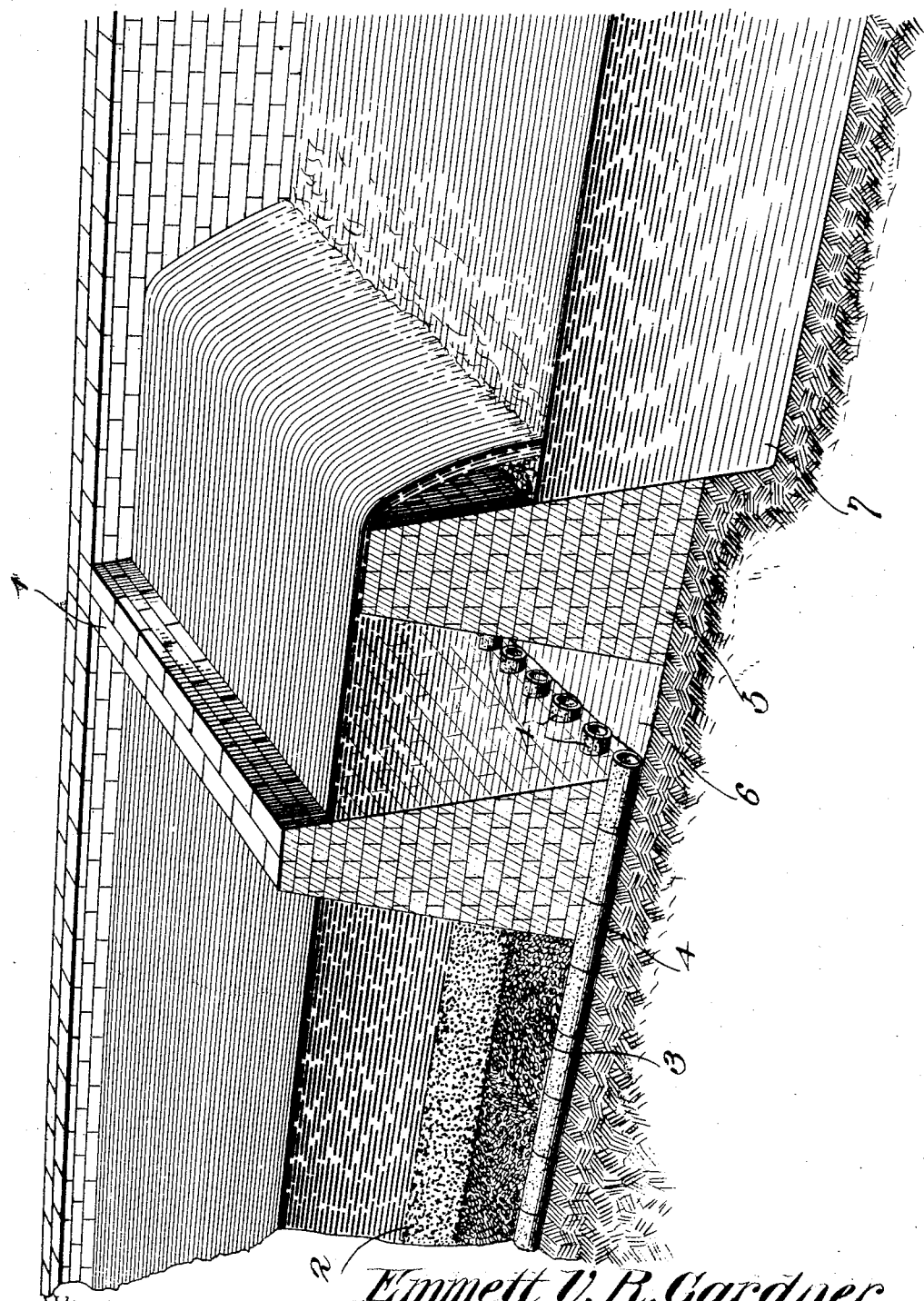

Patented January 10, 1905.

UNITED STATES PATENT OFFICE.

EMMET V. R. GARDNER, OF WESTTOWN, NEW YORK.

FILTER-DAM.

SPECIFICATION forming part of Letters Patent No. 779,703, dated January 10, 1905.

Application filed September 15, 1903. Serial No. 173,314.

*To all whom it may concern:*

Be it known that I, EMMET V. R. GARDNER, a citizen of the United States, residing at Westtown, in the county of Orange and State of New York, have invented a new and useful Filter-Dam, of which the following is a specification.

This invention relates to filter-dams.

The object of the invention is to provide an improved form of filter-dam adapted for use in the filtration-reservoirs of towns and villages by means of which the level of the unfiltered water impounded behind the dam may be maintained at or above a predetermined level, so as to prevent the formation of ice in the filtering-bed and insure the satisfactory operation of the filtering-bed at all times.

In describing the invention reference will be had to the accompanying drawing, in which there is shown in cross-section a portion of the filtering-bed of a filtration plant, the improved dam forming the subject of the present invention, and a portion of the reservoir for the filtered water.

Referring to the drawing, in which the parts are designated by suitable characters of reference, 1 designates an ordinary impounding-dam of the kind generally employed to impound or imprison water in the valley of a small stream in order to form a filtration-reservoir from which filtered water is allowed to pass to a storage-reservoir. The filtration-bed behind the dam 1 comprises an upper layer 2, of sand, and a lower layer 3, of gravel, as usual, and beneath the filtration-bed there are arranged a plurality of conduits 4, of porous drain-tile, that constitute supplemental filters, the discharge ends of which extend under the dam 1.

Parallel to the dam 1 and at a slight distance therefrom is a supplementary dam 5, which is lower than the dam 1 and which is disposed in front of the discharge ends of the porous drain-tile conduits 4, forming a chamber 6 between the two dams, into which said conduits discharge. The supplementary dam 5 forms a check to the direct passage of water from the conduits 4 to the storage-reservoir 7, and water in sufficient quantity to fill the chamber 6 must pass from the conduits 4 before any filtered water can pass over the top of the supplementary dam 5 and enter the storage-reservoir. As water obeys the general law of gravitation and always seeks its level, the surface of the water above the filtration-bed will always be maintained at or above the level of the top of the supplementary dam and the lowering of the level of the water in the storage-reservoir will not affect the level of the water above the filter-bed, as it otherwise would do. By maintaining the level of the water above the filter-bed at or above the level of the top of the supplementary dam 5 the possibility of the formation of ice in the upper surface of the filter-bed, with consequent stoppage of the filtering action, is completely obviated and the action of the filter as long as the supply of water to the filter-bed is maintained is assured.

While the dam above described is designed primarily for use in connection with plants for the filtration of water for use, it may also be employed to advantage in the construction of fish-ponds and ice-ponds. The utility of the dam for fish-ponds lies in the fact that the diminution of the quantity of water in the fish-pond below that desirable for the accommodation of the fish in the pond will be prevented and the escape of water from the pond will take place through the filtering-bed at the bottom and prevent the loss of any of the food for the fish contained in the water. When the dam is used in the construction of ice-ponds, the formation of ice will be facilitated on account of the withdrawal of the warmer water from the bottom of the pond and the maintenance of the level of the water in the pond at a substantially fixed point, so preventing agitation of the surface stratum of water and insuring the formation of clear smooth ice.

In the construction of the dam any suitable material may be employed. Masonry will be preferred where the expense of such construction is not too great, because when so constructed the dam will be stronger and will have greater longevity than when constructed of any other material; but the principles of construction embodied in the invention may be followed in a dam constructed of earth or any other material of which dams are ordinarily constructed.

Having thus described the construction and operation of my invention, what I claim as new, and desire to secure by Letters Patent, is—

1. The combination with a water-receiving basin and a reservoir for filtered water, of an impounding-dam, a filter-bed disposed in rear of the impounding-dam, a supplemental dam disposed in front of the impounding-dam, and porous conduits, constituting supplemental filters, disposed beneath the filter-bed and discharging into the space between the two dams.

2. The combination with a water-receiving basin and a reservoir for filtered water, of an impounding-dam, a filter-bed disposed in rear of the impounding-dam, a supplemental dam disposed in front of the impounding-dam, and of less height than and coextensive in width therewith, and porous tubular conduits, constituting supplemental filters, disposed beneath the filter-bed and discharging into the bottom of the space between the two dams.

In testimony that I claim the foregoing as my own I have hereto affixed my signature in the presence of two witnesses.

EMMET V. R. GARDNER.

Witnesses:
IRA N. GARDNER,
HENRY W. WIGGINS.